(12) United States Patent
Jassal et al.

(10) Patent No.: US 11,527,944 B2
(45) Date of Patent: Dec. 13, 2022

(54) ADDITIVE MANUFACTURING FOR SEGMENTED ELECTRIC MACHINES

(71) Applicant: GENERAL ELECTRIC COMPANY, Schenectady, NY (US)

(72) Inventors: Anoop Jassal, Munich (DE); Jan Erich Hemmelmann, Baldham (DE); Mohamed Osama, Garching (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1795 days.

(21) Appl. No.: 14/960,646

(22) Filed: Dec. 7, 2015

(65) Prior Publication Data

US 2021/0320572 A1    Oct. 14, 2021

(51) Int. Cl.
| | |
|---|---|
| *H01F 7/06* | (2006.01) |
| *H02K 15/04* | (2006.01) |
| *H02K 1/14* | (2006.01) |
| *H02K 3/24* | (2006.01) |
| *H02K 3/26* | (2006.01) |
| *H02K 15/02* | (2006.01) |

(Continued)

(52) U.S. Cl.
CPC ......... *H02K 15/0407* (2013.01); *B22F 10/28* (2021.01); *B22F 10/60* (2021.01); *B33Y 10/00* (2014.12); *B33Y 40/20* (2020.01); *B33Y 80/00* (2014.12); *H02K 1/145* (2013.01); *H02K 3/24* (2013.01); *H02K 3/26* (2013.01); *H02K 15/022* (2013.01); *B22F 2301/35* (2013.01); *H02K 2201/12* (2013.01)

(58) Field of Classification Search
CPC ............ H02K 1/145; H02K 3/24; H02K 3/26; H02K 7/183; H02K 15/022; H02K 15/0407; H02K 2201/12; B33Y 40/20; B33Y 80/00; B33Y 10/00; C23C 28/30; C23C 28/345; C23C 24/04; C23C 26/00; B22F 10/28; B22F 10/60; B22F 10/62; B22F 2301/35; B22F 5/08; B22F 5/106; B22F 2999/00; B22F 2998/10
See application file for complete search history.

(56) References Cited

U.S. PATENT DOCUMENTS

| | | | |
|---|---|---|---|
| 4,155,397 | A | 5/1979 | Honsinger et al. |
| 4,658,846 | A | 4/1987 | Johnson |

(Continued)

FOREIGN PATENT DOCUMENTS

WO    2012175476 A2    12/2012

OTHER PUBLICATIONS

Bang, D, "Design of Transverse Flux PM Machines for Large Direct-Drive Wind Turbines," Busan, Korea; Master of Engineering, Pukyong National University, 2010 ISBN 978-90-5335-36-3.
Chaudhury, et al, "Low silicon non-grain-oriented electrical steel: Linking magnetic properties with metallurgical factors," Journal of Magnetism and Magnetic Materials, vol. 313, 2007, pp. 21-28.

(Continued)

*Primary Examiner* — Paul D Kim
(74) *Attorney, Agent, or Firm* — Dority & Manning, P.A.

(57) ABSTRACT

A method of making a component of an electrical machine is provided. An additive manufacturing process is used to manufacture a part, including applying beams of energy to a successive plurality of ferromagnetic material particles and fusing them together to form a ring or segment of a ring with an axis, a solid portion, and laminas that extend from the solid portion in a radial or axial direction.

20 Claims, 12 Drawing Sheets

(51) Int. Cl.
  *B33Y 80/00* (2015.01)
  *B33Y 40/20* (2020.01)
  *B22F 10/28* (2021.01)
  *B22F 10/60* (2021.01)
  *B33Y 10/00* (2015.01)

(56) References Cited

U.S. PATENT DOCUMENTS

| | | | |
|---|---|---|---|
| 5,045,742 | A | 9/1991 | Armstrong et al. |
| 5,722,032 | A * | 2/1998 | Gay ............... B22F 1/0003 419/36 |
| 6,365,999 | B1 | 4/2002 | Muehlberger et al. |
| 7,146,708 | B2 | 12/2006 | Reiter, Jr. et al. |
| 7,498,080 | B2 | 3/2009 | Tung et al. |
| 7,640,648 | B1 | 1/2010 | Rittenhouse |
| 8,383,985 | B2 | 2/2013 | Twelves, Jr. et al. |
| 8,729,766 | B2 | 5/2014 | Reutlinger et al. |
| 8,878,414 | B2 | 11/2014 | Mourou et al. |
| 9,006,953 | B2 | 4/2015 | Wei et al. |
| 10,193,427 | B2 * | 1/2019 | Jassal ............... B22F 3/24 |
| 2003/0193260 | A1 | 10/2003 | Reiter, Jr. et al. |
| 2013/0056672 | A1 | 3/2013 | Johnston et al. |
| 2014/0035423 | A1 | 2/2014 | Veronesi et al. |
| 2015/0194846 | A1 | 7/2015 | Puetz et al. |

OTHER PUBLICATIONS

De Wulf, et al., "Magnetic properties of Fe 100-x-y Si x P y (0x4, 0y0, 6) soft magnetic composites prepared by diffusion sintering," Journal of Applied Physics, vol. 93, No. 10, 2003, pp. 7109-7111.

Lee, et al, "Characteristic Comparison Between the Spiral and the Lamination Stator in Axial Field Slotless Machines" IEEE Transactions on Magnetics, vol. 45, No. 10, Oct. 2009, pp. 4547-4549.

Lindner, et al, "Screen Printed Components for Electrical Energy Conversion Systems," 6th International Conference on Magnetism and Metallurgy (WMM '14), Cardiff (UK), Jun. 17-19, 2014.

Patterson, et al, "A comparison of Radial and Axial Flux Structures in Electrical Machines," IEEE, 2009, pp. 1029-1035.

Swensen, et al, "Injected 3D Electrical Traces in Additive Manufactured Parts with Low Melting Temperature Metals," 2015 IEEE International Conference on Robotics and Automation (ICRMA), Washington State Convention Center, Seattle, Washington, May 26-30, 2015, pp. 988-995.

Yashiki, et al, "Effect of Hot-Band Grain Size on Magnetic Properties of Non-Oriented Electrical Steels," IEEE Transactions on Magnetics, vol. Mag-23, No. 5, Sep. 1987.

Jassal, et al, Patent Search Report Comparison (Additive Manufacturing for Segmented Electric Machines), Sep. 2015.

Jassal, et al, Patent Search Report Comparison (Method of Fabricating Electric Machine Laminations Using Additive Manufacturing), Sep. 2015.

\* cited by examiner

ADDITIVE MANUFACTURING FOR SEGMENTED ELECTRIC MACHINES

FIELD

The invention relates generally to using an additive manufacturing process to manufacture segmented components for electric machines.

BACKGROUND

In electrical machines, ferromagnetic parts channel magnetic flux. Where relatively large ferromagnetic parts are needed, parts may be manufactured in segments, each segment itself assembled from many components, then segments assembled together to form a core of the ferromagnetic part. Structural features such as slots or grooves, for clamps, conductive windings, or channels for thermoregulation, may also be incorporated into segmented parts. It can be technically difficult, time consuming, and expensive to manufacture and assemble components into segments and segments together to form a core ferromagnetic part. Numerous components may need to be precisely aligned and clamped or otherwise affixed together to form segments, and segments precisely connected together to form a core ferromagnetic part. Such difficulties may also prevent the ability to manufacture ferromagnetic parts with complex topologies that may be preferable because of their increased efficiency, power, or other desirable attributes. Thus, there is a need for an improved method for manufacturing segmented components for electric machines.

SUMMARY

In one embodiment, a method of making a component of an electrical machine is provided. The method includes using an additive manufacturing process to manufacture a part; the additive manufacturing process includes applying a beam or beams of energy to a successive plurality of ferromagnetic material particles and fusing together the successive plurality of ferromagnetic material particles to form the part; and the part includes a ring, or a segment of a ring, having an axis, and a solid portion continuous with a plurality of laminas; and the plurality of laminas extends from the solid portion in a radial direction of the part.

In another embodiment, a method of making a component of an electrical machine is provided. The method includes using an additive manufacturing process to manufacture a part; the additive manufacturing process includes applying a beam or beams of energy to a successive plurality of ferromagnetic material particles and fusing together the successive plurality of ferromagnetic material particles to form the part; and the part includes a ring, or a segment of a ring, having an axis, and a solid portion continuous with a plurality of laminas; and the plurality of laminas extends from the solid portion in an axial direction of the part.

DRAWINGS

These and other features, aspects, and advantages of the present invention will become better understood when the following detailed description is read with reference to the accompanying drawings, wherein.

FIGS. 9A, 9B, 9C, and 9D are schematic drawings of ferromagnetic parts for transverse flux electromagnetic machines manufactured by an additive manufacturing process in accordance with the present invention.

Figure 10A:
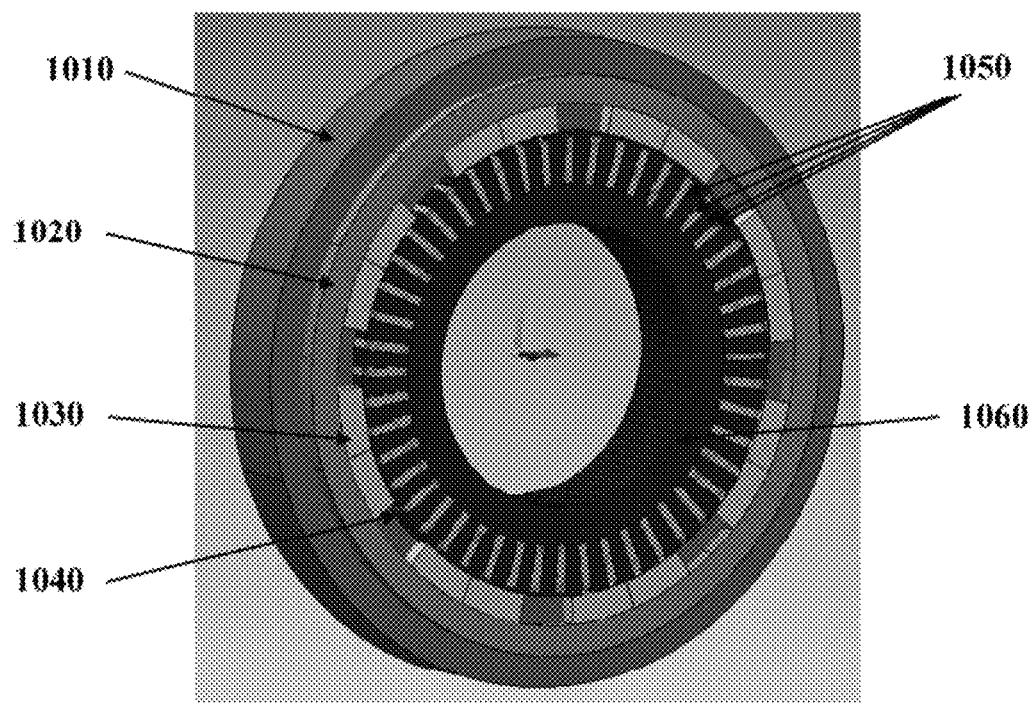
Figure 10B:
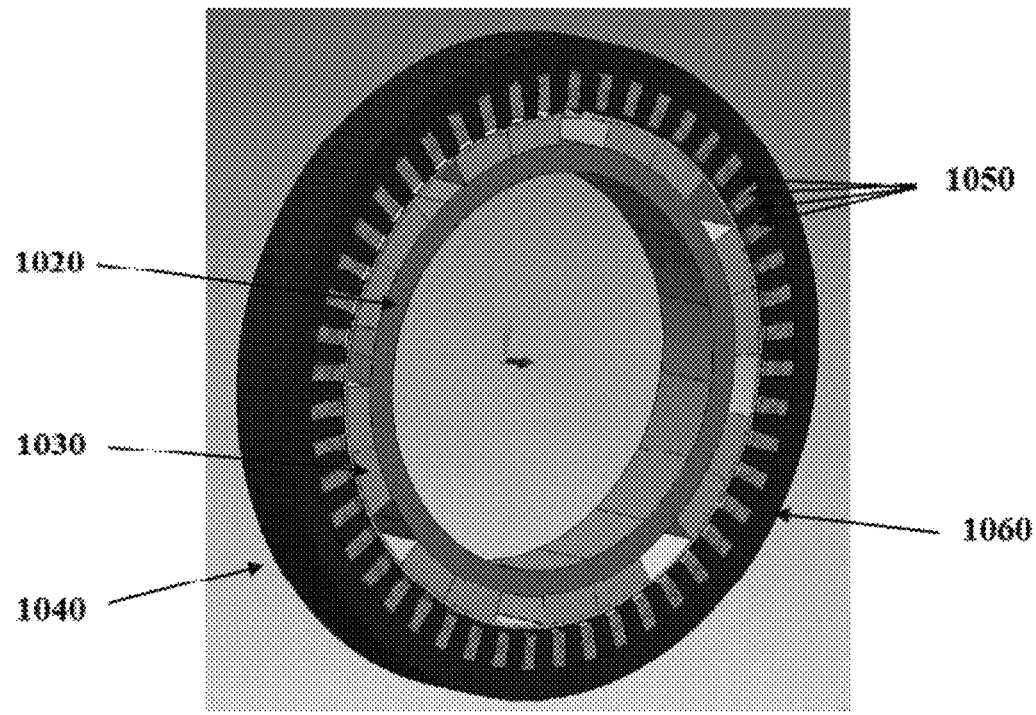

FIG. 10A is an illustration of a rotor located circumferentially outside a stator and FIG. 10B is an illustration of a rotor located circumferentially inside a stator.

DETAILED DESCRIPTION

Embodiments of the present invention are directed to a method of using an additive manufacturing process to manufacture segmented ferromagnetic parts for use in radial, axial, or transverse flux electromagnetic machines. In other embodiments of the present invention, entire core ferromagnetic parts of large electromagnetic machines may be manufactured as single parts without the need to manufacture segments than assemble them together. Using an additive manufacturing process to manufacture such parts presents many desirable advantages, including the ability to increase flux density in parts so manufactured, minimizing eddy current losses, permitting manufacture of ferromagnetic parts, including segmented ferromagnetic parts, with complex topologies in a wider range of sizes with greater ease than enabled by conventional manufacturing processes and minimizing the need to assemble individual components together to manufacture such parts.

In the following description and the claims that follow, whenever a particular aspect or feature of an embodiment of the invention is said to include, comprise, or consist of at least one element of a group and combinations thereof, it is understood that the aspect or feature may include, comprise, or consist of any of the elements of the group, either individually or in combination with any of the other elements of that group. Similarly, the singular forms "a", "an" and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" may not be limited to the precise value specified, and may include values that differ from the specified value. In at least some instances, the approximating language may correspond to the precision of an instrument for measuring the value. In the present discussions it is to be understood that, unless explicitly stated otherwise, any range of numbers stated during a discussion of any region within, or physical characteristic of, is inclusive of the stated end points of the range.

Figure 1:
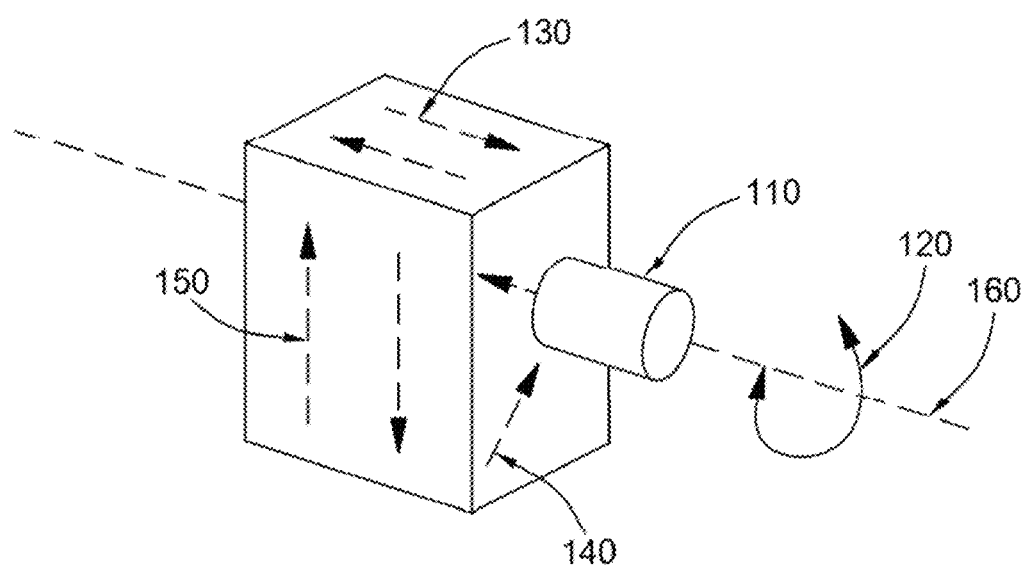
FIG. 1 is an illustration of different directions of magnetic flux in different types of electromagnetic machines.

Electromagnetic machines function in part by inducing the flow of magnetic flux through ferromagnetic components. For example, a magnet may move in proximity to a ferromagnetic part, inducing magnetic flux to flow along flux lines in the ferromagnetic part. Depending on a direction in which flux flows relative to a direction of movement of a magnet, the machine may be considered a radial flux machine, an axial flux machine, or a transverse flux machine. FIG. 1 is a diagrammatic representation of different directions of magnetic flux lines in electromagnetic machines of different topologies with regard to rotation 120 of a rotor 110. In an axial flux machine, axial magnetic flux lines 130 are oriented generally parallel to an axis of rotation 160 of a rotor 110. In radial flux electromagnetic machines, radial magnetic flux lines 140 are oriented generally radially with respect to an axis of rotation 120 of a rotor 110. And in transverse flux electromagnetic machines, transverse magnetic flux lines 150 are oriented generally tangentially to a circumference around an axis of rotation 120 of a rotor 110.

Use of an electromagnetic machine with a radial, axial, or transverse flux topology may be preferable for different applications depending on many factors, such as relative power output, size, expense of manufacture, longevity, operable temperature, or other factors specific to certain applications. An aspect of electromagnetic machine function which may disadvantageously affect performance includes losses. Losses, such as eddy current losses in alternating current machines, may be induced in ferromagnetic parts and lead to a loss of efficiency. Eddy current losses may be advantageously reduced by use of a ferromagnetic core made of laminations of ferromagnetic material coated with an insulating material then packed together to form a core stack. Conventionally, laminations are stamped from sheets of a ferromagnetic material such as electrical grade steel, coated with an insulating material, arranged in a stack, and clamped or fastened together. However, this process can be cumbersome, posing difficulties in stamping individual laminations that conform to the overall desired topology and aligning and clamping them together, as well as difficulties in providing for any cooling or other thermal regulatory channels in the core that may be needed as well as for placement of windings to carry electrical current, as well as high costs, inefficiencies, and lack of flexibility in choice of topology or size.

For some applications, relatively large ferromagnetic core parts may be needed. For example, an electromagnetic machine may require a ferromagnetic core part that is larger than ~1.2 m (the standard size of electrical sheet steel) in a given dimension. It may be difficult, prohibitively expensive, or otherwise unfeasible to manufacture such parts as a single, continuous part via conventional manufacturing processes. Conventionally, such parts are assembled from large segments that are manufactured independently then connected together to form a core ferromagnetic part. Ferromagnetic core parts for large electromagnetic machines, such as gearless mill drives, hydro-electric generators, and wind turbines, as nonlimiting examples, conventionally manufactured from the assembly of segments, may be manufactured in accordance with an additive manufacturing process of the present invention Conventionally, even segments of such machines may be too large to be manufactured as single continuous parts. Such segmented parts may be made by affixing together independently manufactured components.

A limitation on how large a component may feasibly be manufactured for inclusion in such a segmented part is limitations on commercially available sizes of sheets of a ferromagnetic material such as electrical grade steel from which such components may be made. Sheets larger than 1.25 m in width may not be commercially available or economical. Restrictions on the maximum size of parts that may be transported in different jurisdictions also may impose practical limits on the sizes of available sheets of ferromagnetic material or transportation of complete ferromagnetic core parts.

It is also difficult to assemble such sheets together in the requisite exact alignment to form segments and to connect segments together in the requisite exact alignment to form a core ferromagnetic part. Such segment may also need to have slots, notches, or channels to permit clamping or otherwise affixing them together, accommodate conductive components such as windings, or allow for cooling or other thermoregulatory aspects. The shapes and configurations required by including these structural facets further complicate the manufacture of core ferromagnetic parts and segments thereof. Desirably, increasingly complex shapes, orientations, configurations, or other topological features of ferromagnetic portions of core ferromagnetic parts or segments may be incorporated to enhance power, efficiency, or other characteristics of electromagnetic machines, but such features may be difficult or otherwise unfeasible to attain in practical commercial ways via conventional manufacturing technology.

The present invention includes a method for manufacturing ferromagnetic parts and segments thereof of electromagnetic machines of various topologies. An additive manufacturing process may be used to create a continuous ferromagnetic part, obviating the need to assemble individual ferromagnetic components together to form a segment, or segments together to form a part. In one embodiment, an additive manufacturing process is used to manufacture a ferromagnetic segment of a core ferromagnetic part as a single, continuous piece. In another embodiment, an additive manufacturing process is used to manufacture a core ferromagnetic part as a single, continuous piece. Such segments or parts may be manufactured so as to possess insulated laminas so as to minimize eddy current losses. Such segments or parts may also be manufactured with laminas formed in connection with each other so that subsequent attachment or clamping of laminas to each other may be reduced, minimized, or unnecessary.

Regions of a ferromagnetic component, segment, or part through which magnetic flux lines are channeled, or ferromagnetically active regions, may be manufactured as connected to regions of ferromagnetic parts through which no or minimal magnetic flux lines flow during operation of an electromechanical machine containing such part, or structural regions that function in part to hold active regions in the proper orientation, topology, or configuration, thereby resulting in the manufacture of a single part comprising ferromagnetically active and structural regions. Also, channels for temperature regulation (e.g., heat dissipation), spaces for conductive windings, or other conformational characteristics may be built into the part so manufactured as the part is being produced, simplifying the ultimate assembly of an electromechanical machine containing such part. Using an additive manufacturing process in accordance with the present invention also allows for production of parts with complex topologies which are undesirably complex or cost prohibitive to manufacture according to conventional methods.

According to the current invention, a thickness of an insulating layer on a lamina may be very thin, on the order of 10 µm, or 20 µm, or less. A consequence of applying thinner layers of insulation to laminas of a laminated electromagnetic core is an increase in the volume fraction of ferromagnetic material of such core without a concomitant decrease in the density of laminas, or number of laminas per volume of the core part. This increased relative fraction of ferromagnetic material, referred to as stacking factor, may beneficially improve performance, efficiency, or other operating parameters of an electromagnetic machine.

In accordance with the present invention, it is possible to obtain a stacking factor of 90% and above because of the low volume of insulation required to adequately insulate adjoining laminas, with insulation accounting for only <10% of the volume of the ferromagnetic core part. The high stacking factor attainable with the present method is an improvement of other methods such as where soft metal composites are used, because manufacturing a ferromagnetic part from soft metal composites requires incorporating insulation within and throughout the part leading to a higher relative volume taken up by insulation than is attainable with the present invention. For larger core ferromagnetic parts, such as slowly-rotating, high-power parts, eddy current losses may constitute less of a concern, and the possibility of larger eddy current losses may be permitted as a trade-off in exchange for a greater stacking factor >95%. For example, such larger parts may comprise relatively thicker laminas.

Additive manufacturing is a process whereby a source of energy such as a laser beam or electron beam is applied to a portion or portions of a layer of powder or granular material causing the powder or granules to fuse or bind to each other. After fusing a portion of powder or granules together, another layer of powder or granules is deposited over the first layer, and a portion thereof is also fused to itself as well as to a portion or portions of the layer underneath which was previously fused. This process is repeated successively, on layer after layer of powder or granular material. The laser or electron beam or other energy source is directed towards, and fuses, sinters, or melts such portion or portions of successive layers as to create a three-dimensional object. A computer model or program may be used to orient the application of laser or electron beam, or other energy source, to each successive layer, as well as the energy source's intensity, size, and duration.

For example, a laser source, electron beam, or source of other energy may be directed to a scanner and the scanner may implement instructions from a computer to direct the placement, energy intensity, size, and duration of energy application to a portion or portions of layer of powder or granular material in accordance with a computer model or program representing the ultimate three-dimensional shaped part desired. Examples of additive manufacturing processes that may be used in accordance with the present invention include selective laser melting, selective laser sintering, direct metal laser sintering, electron beam melting, or other methods comprising directing an energy beam towards powder or granular material to fuse, agglomerate, melt, sinter, or otherwise attached a portion of particles or granules to each other, as well as to a portion or portions of underlying material which has already been fused, agglomerated, melted, sintered, or otherwise attached together.

Figure 2:
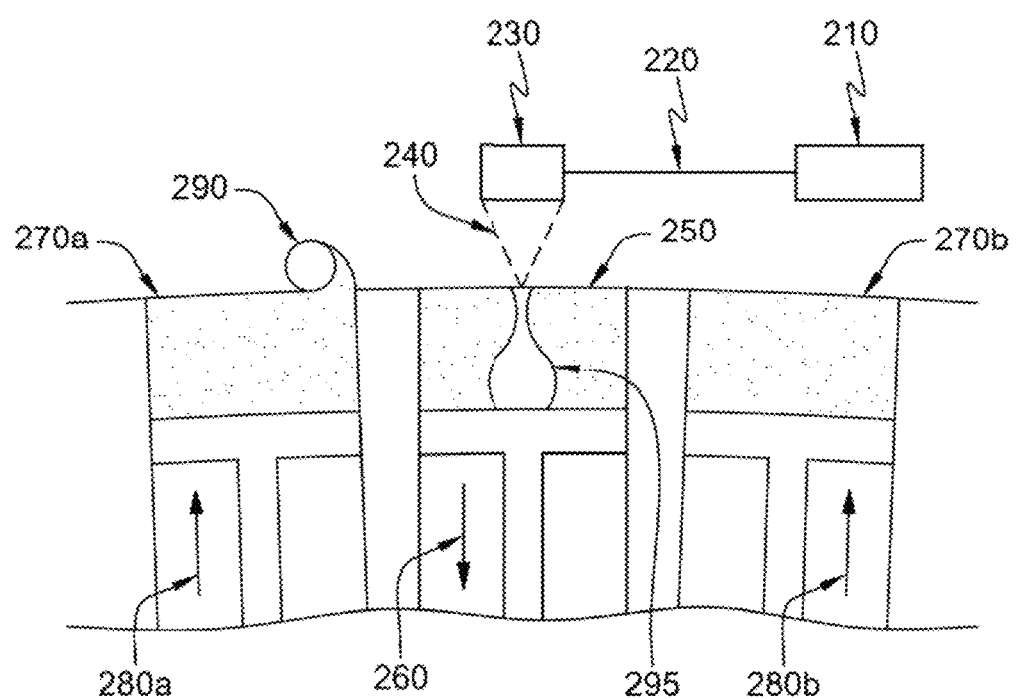
FIG. 2 is a schematic drawing of a system for manufacturing an article using an additive manufacturing process.

A general example of a system for additive manufacturing of a part is presented in FIG. 2. In this example, an energy beam source 210 directs an energy beam 220 towards a scanner 230. The scanner 230, typically in response to instructions received from a computer (not shown), redirects the energy beam 240 towards a surface of a bed 250 of powder or granular material. The location, intensity, size, or other parameters of the energy beam 240 directed to the surface of the bed 250 of powder or granular material may be adapted by the scanner 230 and/or energy beam source 210 so as to fuse, sinter, agglomerate, or melt (referred to generally herein as fusing) powder particles or granules of a portion thereof to each other. When fusion of such portion is completed, the bed may be moved downward 260, and another layer of powder or granular material deposited thereupon.

For example, a source 270a of powder or granular material may be raised upward 280a and a roller 290 or other instrumentality such as a swiping blade (not shown) may push a layer of more powder or granular material onto the bed 250 of powder or granular material. Another round of fusing a portion or portions of particles or granules of the newly deposited layer to each other, and to a portion of the fused material therebelow, would follow. The process is repeated, with the bed 250 of powder or granular material lowered, the source 270a of powder or granular material raised upward 280a, and a new layer of powder or granular material pushed onto the bed 250 of powder or granular material by the roller 290. A portion of the new layer of such particles or granules would be fused to each other, and to a portion of the fused material therebelow. In some examples, there may be a second source 270b of powder or granular material be raised upward 280b and powder or granular material pushed therefrom by the roller 290 onto the bed 250 of powder or granular material between fusion steps in alternation with the source 270a of powder or granular material. Repetition of depositing a new layer of powder or granular material and fusion of a portion or portions thereof, layer by layer, results in manufacture of a three-dimensional part 295.

Additive manufacturing may be used to manufacture complex topologies of parts, such as ferromagnetic parts or segments thereof of electromechanical machines in accordance with the present invention. Custom parts with curved, irregular geometries, as well as cooling channels, slots or spaces to accommodate windings, or notches or spaces to accommodate bindings to compress laminas or individually manufactured parts together following manufacture, are possible. A desired configuration of a part may be programmed into a general purpose computer, such as through provision of computer assisted design (CAD) software or programming, to direct the energy beam source 210 and/or scanner 230, and/or other components of the additive manufacturing system, as to the application of an energy beam relative to the positioning of a bed 250 of powder or granular material to result in the production of a part with the desired configuration. Fusion of particles may be effected by sintering, which entails application of energy to raise the temperature of a portion of powder or granular materials, but not as high as their melting temperature, to cause them agglomerate, or by melting, which entails raising the portion of powder or granular materials to above their melting temperature. Other than controlling the energy beam source 210 and/or scanner 230, a computer may also be used to control lowering 260 of the bed 250 of powder or granular material, raising 280a and 280b a source 270a and 270b of powder or granular material, or operation of the roller 290 as well as positioning of the bed 250 of powder or granular material. The energy beam 220 may be a laser beam, an electron beam, or some other beam of electromagnetic radiation or other energy.

Skilled persons would appreciate that a core ferromagnetic part and segments thereof of a variety of shapes, sizes, configurations, and topologies may be manufactured in accordance with the present invention, by adapting an additive manufacturing process to synthesize a three-dimensional article from powder or granular material in accordance with a preconceived design or programming, and by adopting different sized beds 250 of powder or granular material whereby larger beds could be used for the manufacture of larger components, segments, or parts.

Any of a variety of ferromagnetic powder or granular materials may be used, depending on the characteristics desired in a part manufactured in accordance with the present invention. Ferromagnetic metal and metal alloys, containing or not containing non-metallic constituents, may be used. For example, nickel-iron, silicon-iron, iron, iron-cobalt, ferritic steel, or combinations thereof may be used. Powder or granular material comprising other ferromagnetic material may also be used. Particulate or granular ferromagnetic material is commercially available or can be manufactured to accommodate the needs of a particular application. Powdered or granular materials with an average grain size of anywhere from between approximately 10 µm to approximately 40 µm may be used, as may materials with larger or smaller average grain sizes than these.

In another aspect, after manufacturing a three-dimensional part via an additive manufacturing process, surfaces thereof may be coated with an insulating material. The insulating material between adjacent laminas may prevent or reduce losses, particularly eddy current losses. Insulating material may be deposited on surfaces of a laminated ferromagnetic part or segment thereof by any effective method, such as spray coating the insulating material on said a part, submerging a part in the insulating material then removing the part and allowing a residual layer of insulating material on the part to dry, or vacuum impregnating a part with a layer of insulating material, as several non-limiting examples. Various types of insulating material known in the art for insulating ferromagnetic core parts for electromagnetic machines may be useful as insulating material in accordance with the present invention. Some non-limiting examples include magnesium oxide and organic varnish.

In a further aspect, a segment of a ferromagnetic part comprising laminations manufactured in accordance with the present invention may be connected or assembled together to form a core ferromagnetic part. Segments may be manufactured so as to incorporate slots, notches, or other aspects to assist in the connection together and aligning with requisite spatial accuracy multiple segments. Segments may be arcuate segments of an annular core ferromagnetic part, or of an annular section of a columnar core ferromagnetic part which is assembled by stacking a plurality of such annular sections to one another. A layer of insulating material may or may not have been deposited on segments before they are assembled together to form annular or columnar core ferromagnetic parts. Use of insulation material may be preferable if diminution of eddy current is desired, although for some applications in accordance with the present invention insulating material might not be applied. For example, air spaces between laminas may provide sufficient insulation for some applications. As mentioned above, other aspects of a part may also be incorporated during manufacture such as the inclusion of channels for regulating temperature (e.g., dissipating heat) within the part during operation of an electromagnetic machine in which it is used.

Examples

The following examples are presented to further describe the techniques, but should not be read as limiting, because variations still within the scope of embodiments of the present invention will be apparent to those skilled in the art.

Figure 3A:
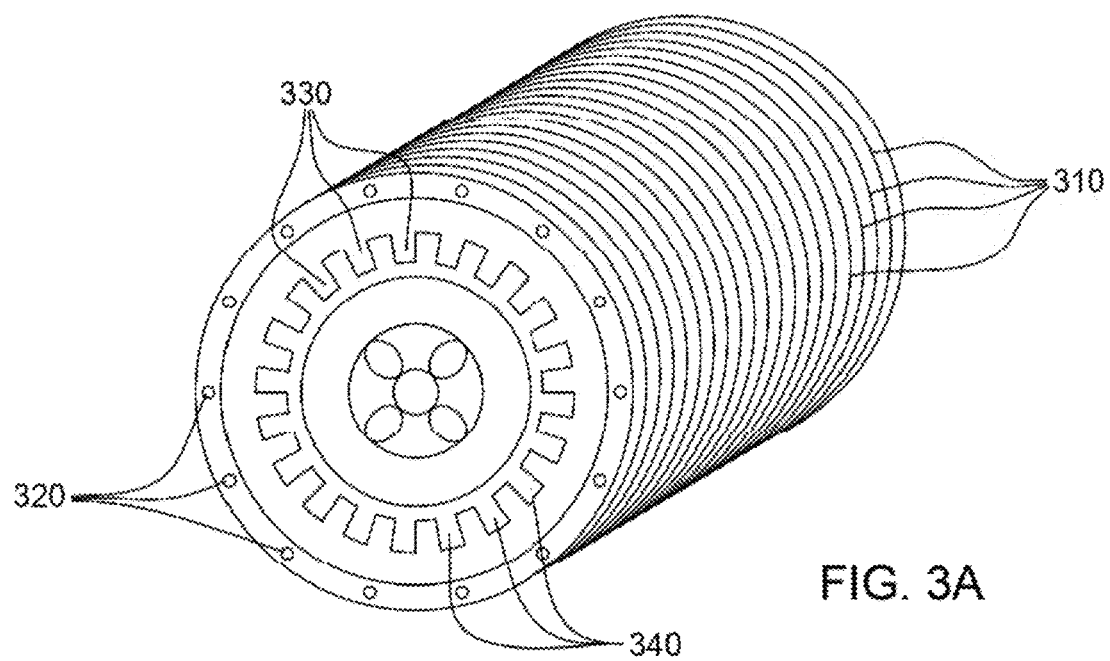
FIGS. 3A and 3B are drawings of a ferromagnetic core part of a radial flux electromagnetic machine.
Figure 3B:
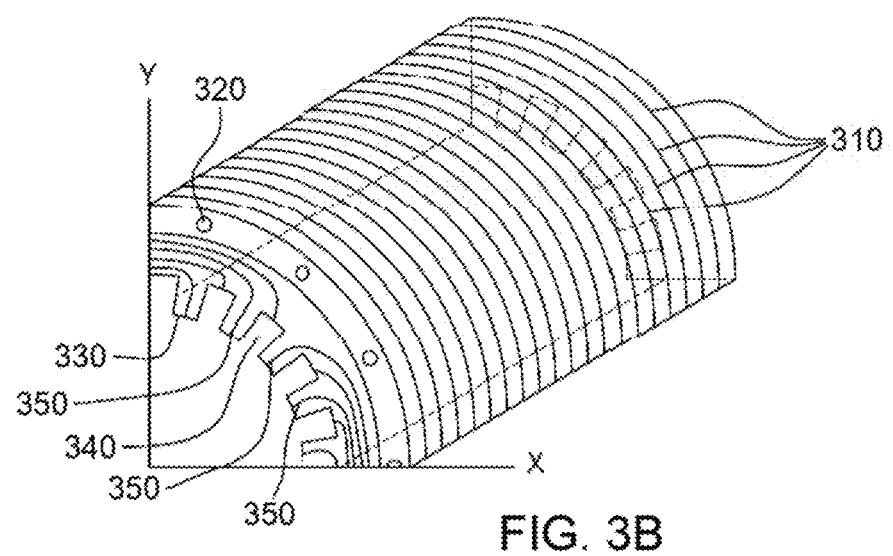

In an example, an additive manufacturing process is used to manufacture a ferromagnetic core part for an electromagnetic machine. FIGS. 3A and 3B show a general topology for a segmented, columnar ferromagnetic core part. FIG. 3A is a drawing of the core ferromagnetic part, and FIG. 3B is a cut-away drawing of a stack of segments of such part. The part and segment are comprised of laminas 310 stacked one adjacent to another longitudinally along a length of the columnar part. Notches, indentations, bolt-holes 320, or other features may be incorporated as part of each laminar component of the part or segment to facilitate assembly of them together into a complete segment or part. Examples of such features are illustrated in FIGS. 3A and 3B around the outer periphery of the part or segment. Moving in a radially inward direction from such features, teeth 330, separated by slots 340, project inwardly from the radially outward periphery of the part or segment. If a magnetic rotor is positioned along the radially central axis of the part and rotated around said radially central axis, magnetic flux lines 350 are induced in the part or each segment thereof. Magnetic flux lines 350 occur in the section proximal to the teeth and slots, radially inward from the outer region. Magnetic flux lines 350 may be limited to the radially inward region of the columnar part or segment proximal to teeth 330 and slots 340, constituting a ferromagnetically active region, and excluded from the radially outward region, constituting a structural region. In this example, a function of the structural region is to bind successive laminas to one another to form a segment or part, and the magnetically active region functions to channel magnetic flux. The structural region may be substantially solid. In this example, laminas extend in an inward radial direction and magnetic flux is channeled in a radial direction, such as may be employed in a radial flux electromagnetic machine. In accordance with the present invention, an additive manufacturing process may be used to manufacture an entire core ferromagnetic part with an overall topology like that illustrated in FIG. 3A for use in a radial flux electromagnetic machine, or a plurality of segments or components thereof for assembly into a complete part.

Figure 4:
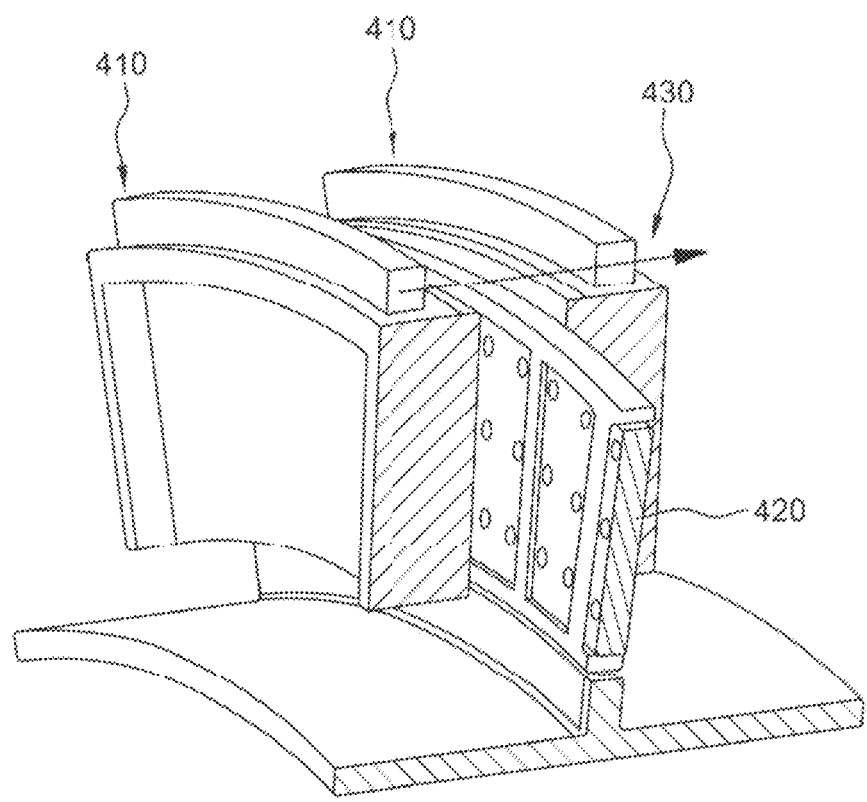
FIG. 4 is a drawing of a portion of a ferromagnetic core part of an axial flux matching.

In another example, referring to FIG. 4, a ferromagnetic may be an annular part around an axis. In FIG. 4, two portions 410 of a ferromagnetic part are shown with a magnet 420 therebetween. The portions 410 may be part of an arcuate segment of a ferromagnetic part. Optionally, portions 410 may be manufactured as components of an annular segment of a ferromagnetic part comprising one piece rather than as components of a plurality of arcuate segments which are assembled together in order to form an annular segment. Annular segments, or arcuate segments assembled into annular segments, having a radial center may be stacked longitudinally forming a columnar ferromagnetic part. Alternatively a columnar ferromagnetic core part may be manufactured as one piece, without requiring assembly of components, portions, or segments together to form the part. If magnet 420 is rotated around the central axis of an annular or columnar ferromagnetic part as described above, magnetic flux lines 430 will form in the annular or columnar ferromagnetic part that are generally parallel to the axis of the annular or columnar ferromagnetic part, such as for use in an axial flux electromagnetic machine.

Figure 5:
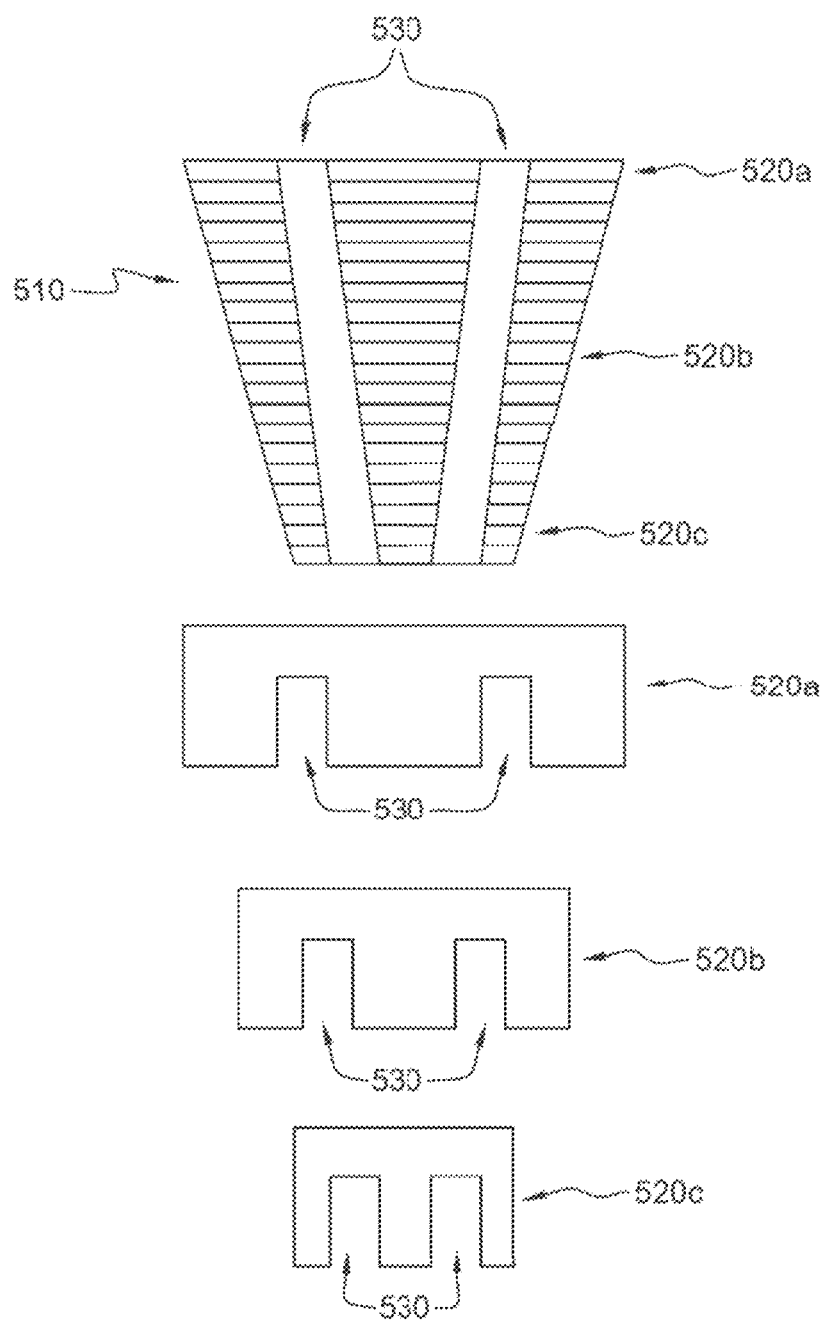
FIG. 5 is a drawing of a stack of laminas of a ferromagnetic core part for an axial flux machine and drawings of laminar components used to assemble a such a part.

A more detailed view of portion 410 of a ferromagnetic part is shown in FIG. 5, showing a stack 510 (front view) of ferromagnetic laminas 520*a-c* (front and top views) of portion 410. Slots 530 guide magnetic flux lines during relative rotation of a magnetic and a ferromagnetic part. Conventionally, portion 410 of a ferromagnetic part is manufactured by manufacturing laminas 520*a-c* from individual sheets of ferromagnetic material then assembling and fixing them together in a stack, with the corresponding aforementioned feasibility and economic limitations of assembling ferromagnetic parts from components (pertaining, for example, to size, topological complexity, structural and thermoregulatory features, etc.). In accordance with the current invention, manufacturing such parts by an additive manufacturing process may avoid or minimize some or all of these limitations.

Figure 6:
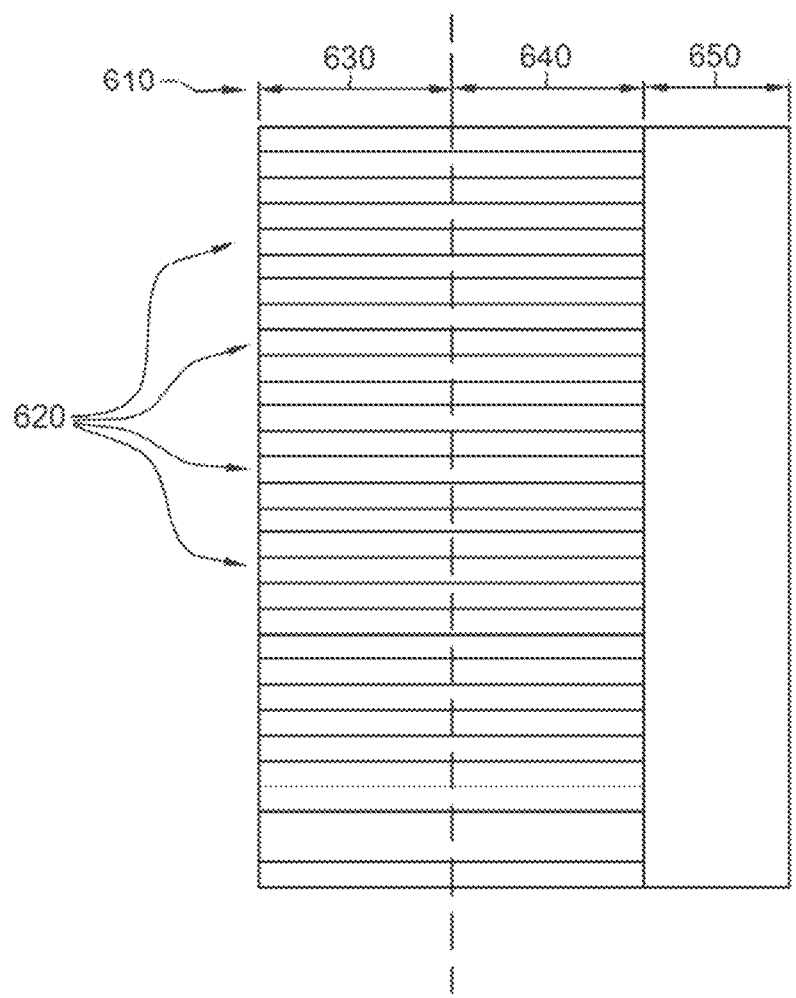
FIG. 6 is a drawing of laminas of a core ferromagnetic part for an axial flux or radial flux electromagnetic machine in which the laminas are continuous with a region of the part which remains magnetically active during operation of an electromagnetic machine of which it is a part in accordance with the present invention.

FIG. 6 is a side-view illustration of a stack 610 of ferromagnetic laminas manufactured in accordance with the present invention. In some respects, stack 610 corresponds generally to stack 510 as shown in FIG. 5 in that it is comprised of ferromagnetic laminas 620. Not shown are slots (corresponding to slots 530 of FIG. 5) to guide magnetic flux lines. Slots would be present in magnetically active region 630 of stack 610, which, when disposed in an electromagnetic machine apposed to a magnetic part in a manner such as illustrated in FIG. 4, would be proximal to the magnetic part. Adjacent the magnetically active region 630 is connecting region 640, some of which may be magnetically active during operation of an electromagnetic machine of which it is a part, particularly proximally to magnetically active region 630. Adjacent connecting region 640, on the side thereof opposite the magnetically active region 630, is structural region 650. Structural region 650 may be substantially solid, meaning, relative to laminas which extend from it, lacking non-ferromagnetic spaces other than those which may be included to facilitate assembly of segments or sections to one another following additive manufacturing fabrication, or channels for thermal regulation. Ferromagnetically active region 630, connecting region 640, and structural region 650 may constitute different proportions of stack 610 than illustrated in FIG. 6 for different applications, and the relative dimensions of such region are not drawn in FIG. 6 to any particular scale or limiting proportions. Structural region 650, as part of one piece continuous with the laminas 620, manufactured by an additive manufacturing process in accordance with the resent invention, would function to hold the laminas fixed together and oriented properly in the desired topology and configuration without the need of a step to separately affix, clamp, or otherwise attach separate laminar components together.

The additive manufacturing process of the present invention may thereby result in the manufacture of a single part comprising ferromagnetically active and structural regions such as represented in FIG. 6. Not shown in FIG. 6, but optionally included, are channels for temperature regulation (e.g., heat dissipation), spaces for conductive windings, or other conformational characteristics that may be incorporated into the part as part of the additive manufacturing process, simplifying the ultimate assembly of an electromechanical machine containing such part.

Figure 7A:
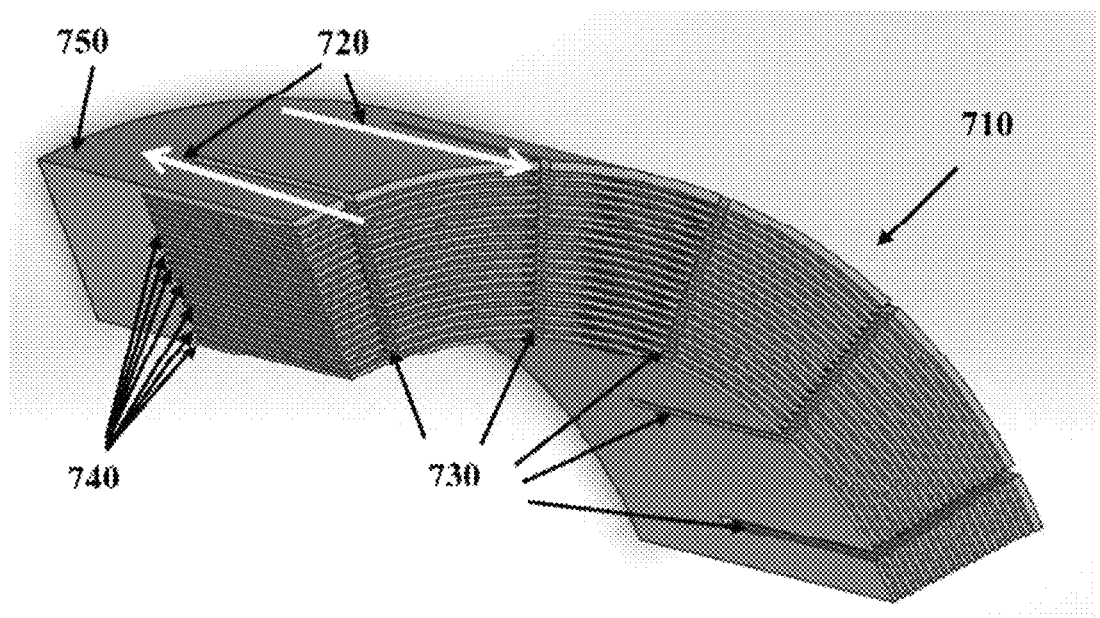
FIGS. 7A and 7B are a drawing and photograph, respectively, of a segment of a laminated ferromagnetic part for use in an axial flux electromagnetic machine manufactured in accordance with the present invention.
Figure 7B:
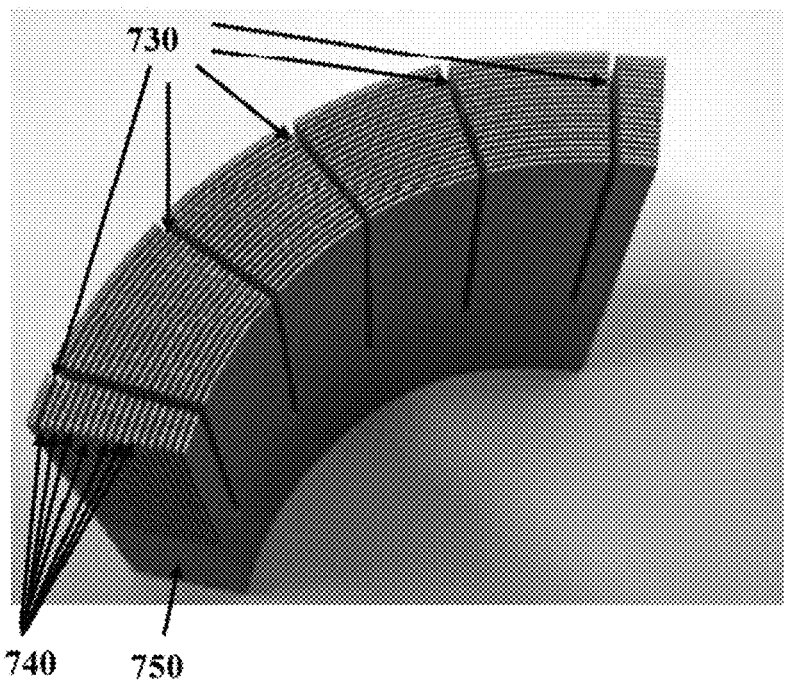

A general method for producing parts in accordance with the present invention was described above as schematically diagrammed in FIG. 2. In an Example, using the general method depicted in FIG. 2, granular martensitic steel was used as the starting material, with an average grain size of approximately 20 µm. A ferromagnetic part was manufactured by an additive manufacturing method comprising laser melting. A computerized configuration of a part was provided and used to direct the application of laser beams to successive layers of granular martensitic steel to form a three-dimensional martensitic steel part. Photographic images of a ferromagnetic part manufactured in accordance with this Example are shown in FIGS. 7A-7B. FIG. 7A shows a drawing of an arcuate portion of a laminated ferromagnetic part 710 for use in an axial flux electromagnetic machine with magnetic flux lines 720 indicated. And FIG. 7B is a photograph of such an arcuate portion of a laminated ferromagnetic part 710 manufactured by an additive manufacturing process as disclosed herein in accordance with the present invention. As disclosed herein, a layer of insulation may be deposited on an arcuate portion of a laminated ferromagnetic part 710, or on portions thereof including but not limited to laminas. A plurality of arcuate portions of a laminated, optionally insulated ferromagnetic part 710 could be connected end-to-end to form an annular ferromagnetic part of an electromagnetic machine. Alternatively, an annular ferromagnetic part of an electromagnetic machine may be manufactured, and optionally a layer of insulation disposed thereon, in accordance with the present invention, rather than such annular ferromagnetic part being assembled from a plurality of laminated ferromagnetic parts 710.

If an annular ferromagnetic part, manufactured as a single part or assembled from a plurality of arcuate portions of a laminated ferromagnetic part 710, were disposed adjacent to a magnet rotated with an axis of rotation aligned with the central axis of the annular ferromagnetic part, magnetic flux lines 720 may be induced within the laminas that are generally parallel to the axis of rotation of the magnet, in accordance with an axial flux topology. Slots 730 in an annular ferromagnetic part may guide magnetic flux lines 720. Optionally, laminations 740 may reduce eddy current losses, and close apposition of laminations 740 may allow for an increased stacking factor of such a part.

Arcuate portion of a ferromagnetic part 710 may correspond to stack 610 from FIG. 6 and stack 510 from FIG. 5, with structural portion 750 corresponding to structural portion 650. In that topology, the induction of magnetic flux lines 720 generally parallel to the axis of rotation of the magnet would be consistent with a topology employed in an axial flux electromagnetic machine. A plurality of arcuate portions of a ferromagnetic part 710 could be connected end to end to form an annular section or segment, annular sections or segments could be assembled along a longitudinal axis to form a columnar ferromagnetic part, or columnar ferromagnetic part could be manufactured in one piece by an additive manufacturing process, all in accordance with the present invention Modifications of the topology, manufactured in accordance with the present invention, could also be adopted. For example, a radial flux ferromagnetic part, or segments or sections thereof, could be manufactured by an additive manufacturing process. For example, an arcuate portion of a ferromagnetic part similar in some ways to but different in others from that illustrated in FIGS. 7A and 7B may be manufactured. In the example illustrated in FIGS. 7A and 7B, laminations extend from structural region 750 in an axial direction (i.e., in a direction substantially parallel to a central axis of an annular or columnar ferromagnetic part of which it is a section or segment). Structural region may be substantially solid. In another example, laminations could instead extend radially inward from, and form one continuous piece with, a structural region, with a structural region that forms an arc or circumference around a radius of curvature of the arcuate or annular section or segment or columnar part of which it is an aspect. Such a section or segment, with radially extending laminas continuous with a peripherally situated structural region together with which they form a single piece, could be manufactured by an additive manufacturing process in accordance with the present invention and, for example, be a section or segment of a ferromagnetic part for a radial flux electromagnetic machine such as illustrated in FIGS. 3A and 3B. Whereas the ferromagnetic part illustrated in FIGS. 3A and 3B is comprised of laminas secured together by means of features incorporated into their shape, such as with bolt holes 320 as one non-limiting example, need for such features for affixing laminas together may be eliminated or minimized be manufacturing laminas that are continuous with and form a single piece with a peripherally oriented structural region, from which they extend in an inwardly radial direction, in accordance with the present invention. Such parts may also be fabricated to include other features for connecting annular or arcuate sections or segments together, or with channels for regulating temperature such for heat dissipation, in accordance with the present invention. Laminas or other regions may also be insulated in accordance with the present invention.

Ferromagnetic particles of granules other than martensitic steel may be used as starting material. Such ferromagnetic materials may be metals or metal alloys and may contain non-metallic constituent such as carbon or silicon, or others. Non-limiting examples include iron, nickel-iron, silicon-iron, iron-cobalt, ferritic steel, or combinations thereof. Combinations of ferromagnetic and non-ferromagnetic particles or granules may be mixed together and used in an additive manufacturing process to create a part that is overall ferromagnetic on account of a distribution of ferromagnetic components throughout its structure.

Skilled artisans would recognize that other exemplar topologies of ferromagnetic parts for use in axial flux machines could also be manufactured in accordance with the present invention.

Figure 8:
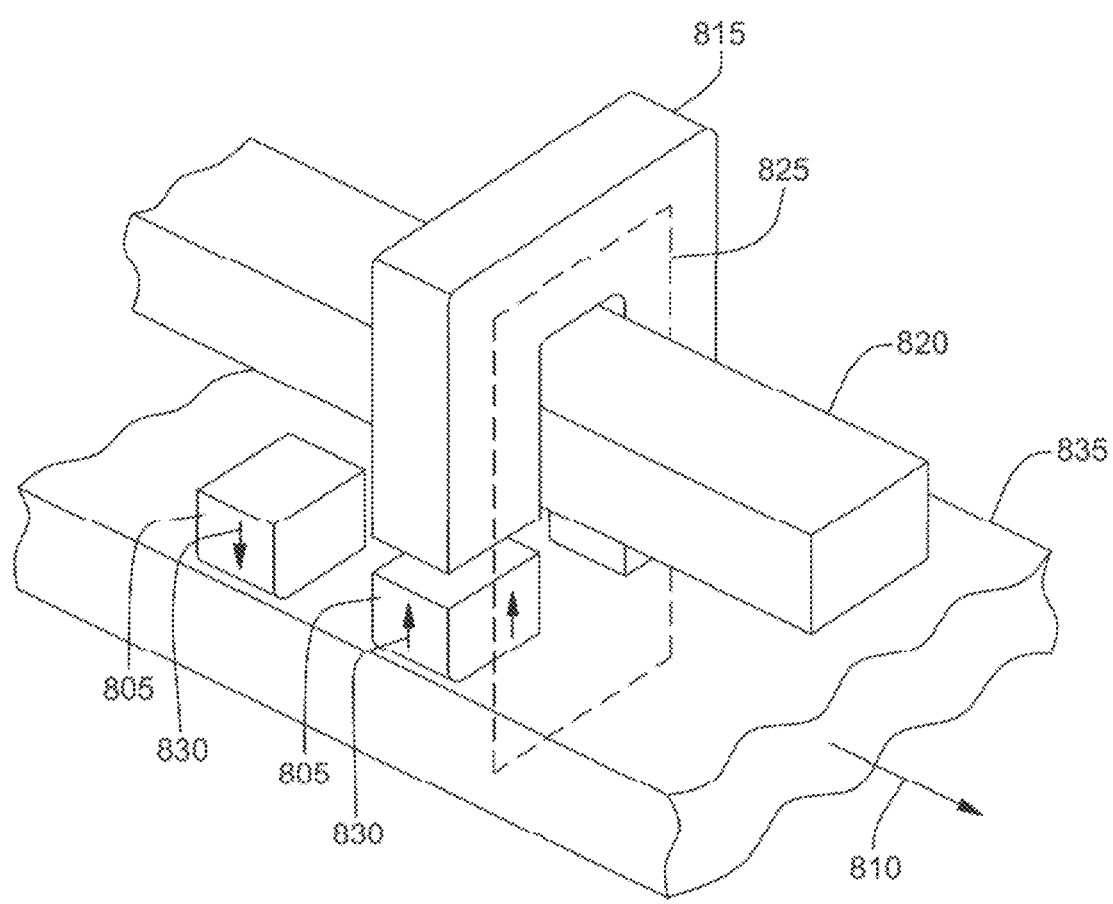
FIG. 8 is a schematic diagram of a general topology for a ferromagnetic part for a transverse flux electromagnetic machine.

Other examples of more complex topologies of ferromagnetic parts for electromagnetic machines that can be manufactured in accordance with the present invention are diagrammatically shown in FIG. 8 and FIGS. 9A-9D. FIG. 8 shows a general diagram for a simple transverse flux electromagnetic machine topology. Magnets 805 with alternating polarity 830 are situated on substrate 835. A ferromagnetic part 815, manufactured in accordance with the present invention, is disposed around winding 820. When substrate 835 and magnets 805 move in direction 810, magnetic flux lines 825 are created in ferromagnetic part 815. If substrate 835 is annular, encircled by a ring comprising a plurality of ferromagnetic parts 815, and movement 810 comprised rotation of magnets 815 around an axis of rotation at the radial center of the annular substrate 810 (i.e., aligned with a longitudinal axis therethrough), a direction of magnetic flux lines 825 would comprise a direction that is generally tangential to a circumference around the axis of rotation, such as may be employed in a transverse flux electromagnetic machine topology.

Numerous examples of transverse flux electromagnetic machines, including those comprising variations of the topology illustrated in FIG. 8, or other topologies where magnetic flux is guided in a direction generally tangential to a circumference around an axis of rotation of a ferromagnetic part relative to a magnet, are also known in the art. Any of the examples presented herein or others may be manufactured by an additive manufacturing process in accordance with the present invention. They may also be manufactured as segments or segments of ferromagnetic parts, which segments or sections are assembled together after fabrication by an additive manufacturing process, to form complete ferromagnetic parts. Such sections or segments may be fabricated to incorporate elements or features to assist with assembling them together, such as notches, bolt-holes, slots, grooves, etc., and with features to assist with temperature regulation, such as cooling chambers for heat dissipation. It should be understood that all of the foregoing options would be optional aspects of all of the following examples.

Figure 9A:
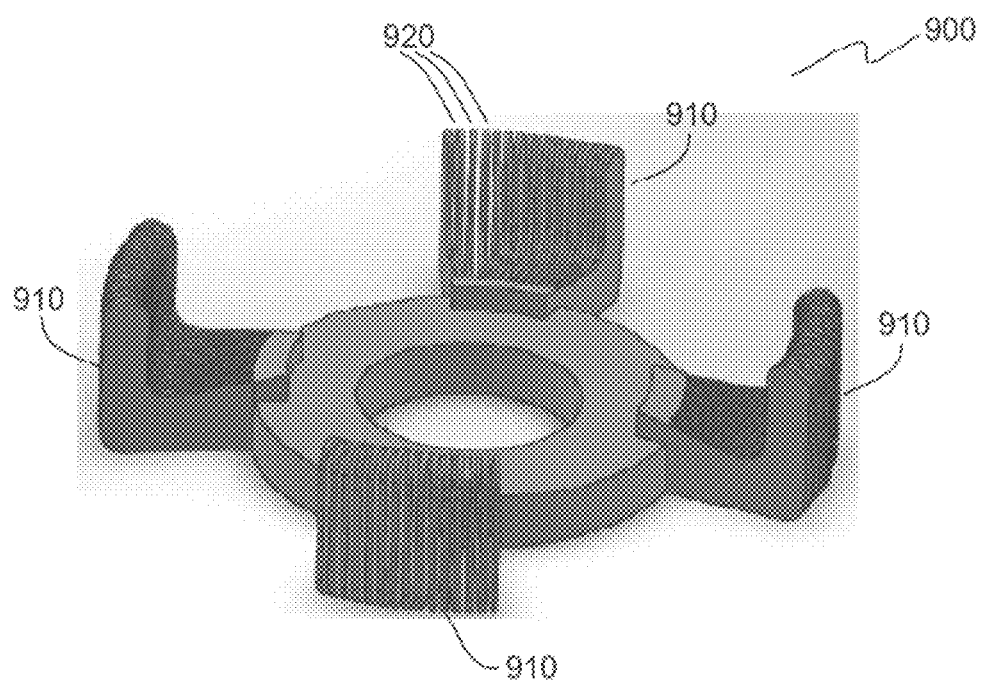
Figure 9B:
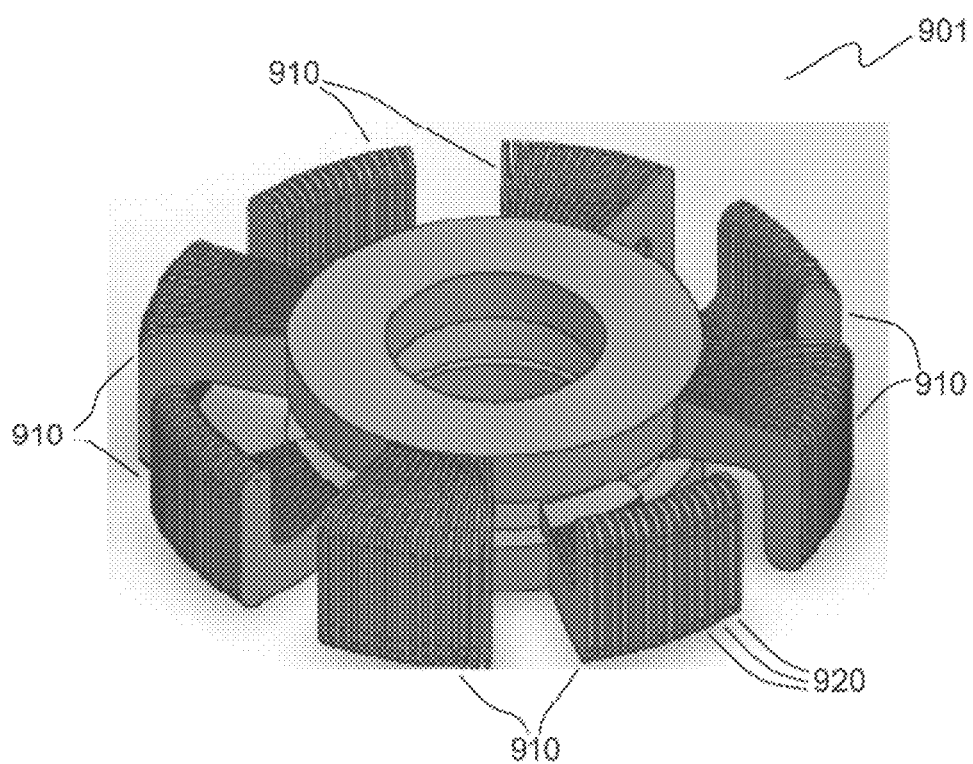

An example of a ferromagnetic part for a transverse flux electromagnetic machine that may be manufactured in accordance with the present invention is shown if FIGS. 9A-9B. FIGS. 9A-9B are a diagrammatic representation of a transverse flux machine topology referred to as a claw pole. One half of a ferromagnetic part of a claw pole 900 is shown in FIG. 9A and two halves of a ferromagnetic claw pole assembled into one ferromagnetic claw pole component 901 is shown in FIG. 9B. In this example, the one ferromagnetic claw pole component 901 comprises eight claws 910, four attached to each half of a ferromagnetic part of a claw pole 900. During operation, a permanent magnet or an electro-magnet, which may be situated within the ferromagnetic claw pole component 901, between each half of a ferromagnetic part of a claw pole 900, is rotated around an axis of rotation centered at the radial center of the ferromagnetic claw pole component 901 (i.e., aligned with a longitudinal axis through the ferromagnetic claw pole component 901). Such rotation causes magnetic flux lines to flow, in a portion of claws 910 that is oriented perpendicular to a plane comprising the central ring of the at their distal ends that is parallel to an axis of rotation of the magnet ferromagnetic claw pole component 901, in a direction generally tangential to a circumference around an axis of rotation of the magnet.

Unlike in conventional claw pole topologies, the ferromagnetic claw pole component 901 illustrated in FIG. 9B comprises laminations 920 within claws 910. The laminations, upon which a layer of insulation may be disposed, may prevent losses, such as eddy current losses, in the poles, thereby enhancing the efficiency of a ferromagnetic claw pole component 901 compared to a claw pole whose claws do not comprise laminations. The complex laminated topology illustrated in FIG. 9A, difficult to manufacture by conventional methods, may be manufactured by a method in accordance with the present invention. According to the present invention, a half of a ferromagnetic part of a claw pole 900, or ferromagnetic claw pole component 901, may be manufactured by an additive manufacturing process. Such process may eliminate the need to connect individual substituents of a half of a ferromagnetic part of a claw pole 900, or ferromagnetic claw pole component 901, to each other to assemble a half of a ferromagnetic part of a claw pole 900, or ferromagnetic claw pole component 901, respectively, because a complete half of a ferromagnetic part of a claw pole 900 or ferromagnetic claw pole component 901 could be manufactured in one piece by an additive manufacturing process in accordance with the present invention. Individual components could also be manufactured and assembled together after an additive manufacturing process.

As described above, an insulating layer could also be deposited on laminas 920 of claws 910 according to known methods.

Figure 9C:
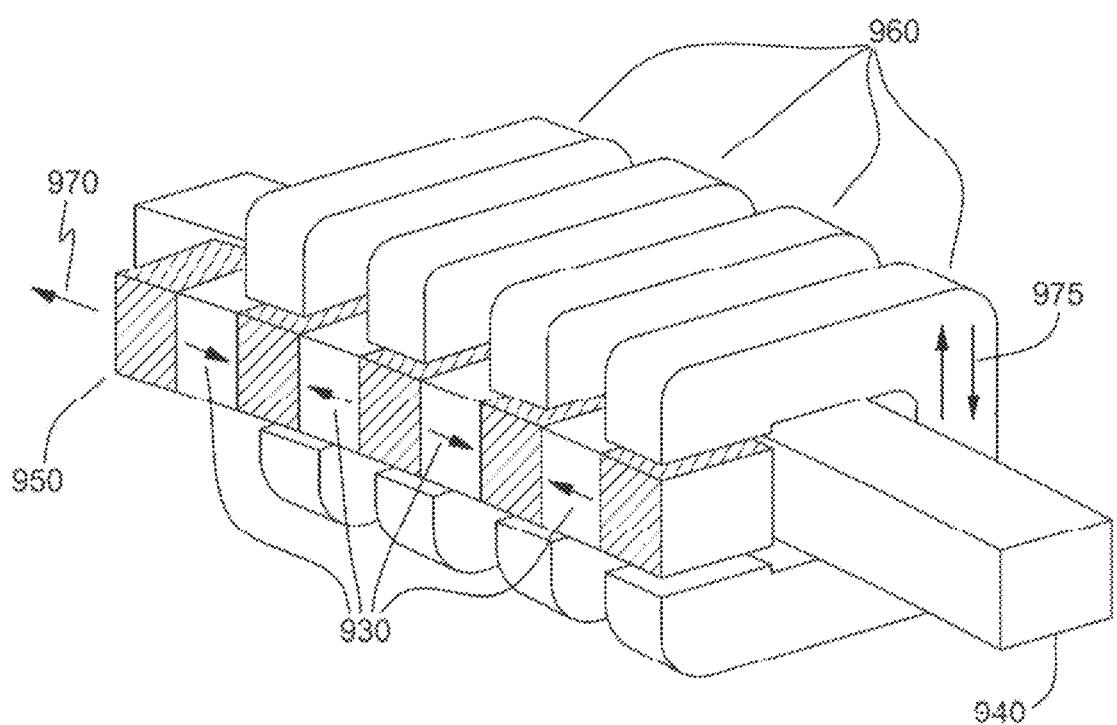
Figure 9D:
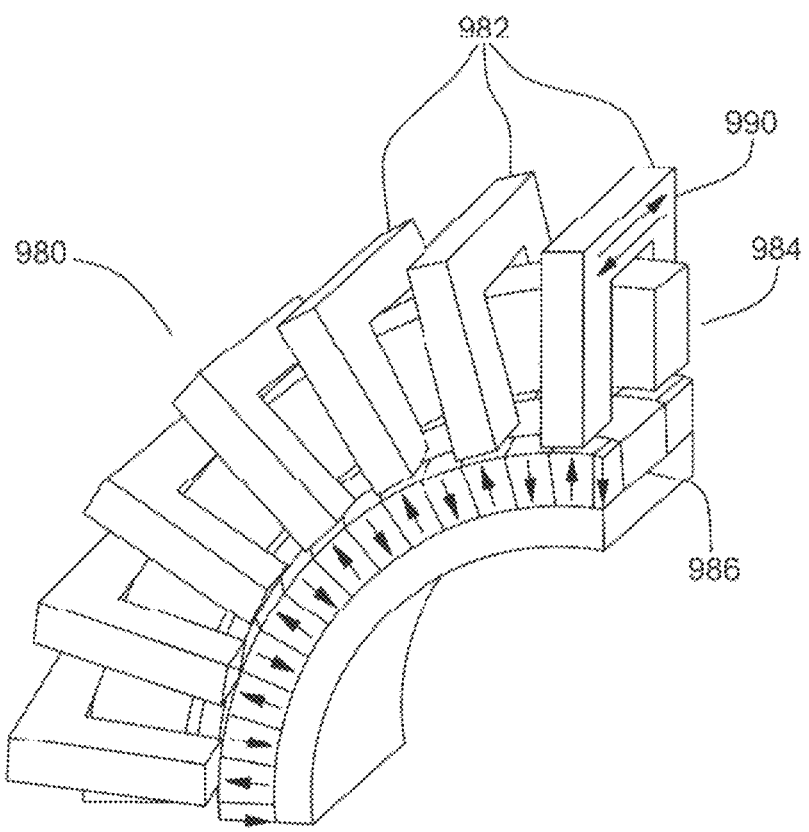

Other, non-limiting examples of types of transverse flux electromagnetic machines that can be created in accordance with the present invention are schematically illustrated in FIGS. 9C-9D. In a transverse topology illustrated in FIG. 9C, C-shaped ferromagnetic parts 960 curve around a winding 940. Laminated magnetic component 950 is oriented between the open ends of C-shaped ferromagnetic parts 960. In this example, laminated magnetic component 950 comprises magnets whose polarities 930 alternate successively. In this example, if magnetic component 950 were moved in direction 970, magnetic flux lines would be created along portions of the C-shaped ferromagnetic parts 960 distal to the C-shaped opening 975. This direction of magnetic flux lines 975 relative to a direction of movement of magnetic component 970 is such as would be employed in a transverse flux topology of a ferromagnetic machine (e.g., if the winding 940, magnetic component 950, and series of C-shaped ferromagnetic parts 960 were extended along a curvature at each end to create an annular structure). A topology for a transverse electromechanical machine illustrated in FIG. 9C may be manufactured by an additive manufacturing process in accordance with the present invention as described above. C-shaped ferromagnetic parts 960 may be thereby manufactured either separate from or connected to each other, depending on the preferred method of assembly of a desired machine. C-shaped ferromagnetic parts 960 may optionally comprise laminations (not shown), which may optionally comprise a layer of insulation deposited thereupon.

Another topology for a transverse flux electromagnetic machine is illustrated in FIG. 9D. For simplicity of presentation, only one quarter 980 of a complete annular structure is shown in FIG. 9D. Ferromagnetic parts 982 are disposed around winding 984 and in apposition to magnetic component 986. Arrows within magnetic component 986 indicate magnets with successively alternating polarity. The complete annular structure of which quarter 980 is a part forms a circumference around a radial center. Magnetic component 986 is rotated relative to ferromagnetic parts 982 with an axis of rotation centered at the radial center of the complete annular structure (i.e., along a longitudinal axis of a complete annular structure of which one quarter 980 is a part). Such motion of magnetic component 986 relative to ferromagnetic parts 982 causes magnetic flux to flow at the outer rims of the ferromagnetic parts 982 in directions indicated by arrow 990, i.e., generally tangential to a circumference around a rotational axis of magnetic component 986 relative to ferromagnetic parts 982, characteristic of a transverse flux topology for an electromagnetic machine. The topology illustrated in FIG. 9D may be manufactured in accordance with the present invention as described above. Ferromagnetic parts 982 may be manufactured separately from each other and assembled together subsequent to an additive manufacturing process, or may be manufactured connected together as a single component as part of an additive manufacturing process. Ferromagnetic parts 982 may also comprise laminations (not shown) and laminations may optionally comprise a layer of insulation disposed thereupon. Skilled artisans would recognize that other exemplar topologies of ferromagnetic parts for use in transverse flux machines could also be manufactured in accordance with the present invention.

Electromagnetic machines comprise rotors and stators and the additive manufacturing method of the present invention may be used to manufacture either component or both. In an embodiment, an additive manufacturing process is used to manufacture a rotor. A rotor may be circumferentially outside of a stator, or it may be circumferentially inside a stator. An example of a rotor located circumferentially outside a stator is shown in FIG. 10A and an example of a rotor located circumferentially inside a stator is shown in FIG. 10B. FIGS. 10A-B show a stator 1040 comprising ferromagnetic laminas alternating with conductive wirings 1050 and a ferromagnetically active back-iron part 1060. (If the radial thickness of ferromagnetically active back-iron part 1060 were large enough, during operation magnetic flux lines might not be channeled through some portion of ferromagnetically active back-iron part 1060, specifically the part most radially distal from magnets 1030, in which case such portion would not itself be ferromagnetically active.) An annular ferromagnetic rotor 1020 comprises magnets 1030. Rotation of the rotor relative to the stator causes magnetic flux to flow through the magnets 1030 and ferromagnetic aspects of stator 1040. An annular ferromagnetic rotor 1020 may be laminated, such as to improve efficiency, temperature tolerance, or for other desirable reasons. Conventionally, laminas of an annular ferromagnetic rotor 1020 may need to be manufactured independently of each other then assembled together such as with clamping, which may be disadvantageously difficult or time-consuming. Furthermore, during operation, such clamped laminas may slip due to centrifugal forces and may impair functionality, efficiency, or other operative qualities of the electromagnetic machine of which it is a part. Incorporation of cooling channels for heat dissipation in such parts may also be difficult by conventional manufacturing methods.

Manufacturing ferromagnetic rotors and features thereof by an additive manufacturing process in accordance with the present invention is an improvement over conventional methods. If a rotor is positioned circumferentially outside a stator (FIG. 10A), it may require a protective covering, such as for environmental or mechanical protection. An example of such protection is shown in FIG. 10A as a rotor retaining ring 1010. By using an additive manufacturing process in accordance with the present invention, a rotor retaining ring 1010 and annular ferromagnetic rotor 1020 may be manufactured as a single piece, for example, thereby improving structural integrity of the part, such as in comparison to a laminated rotor manufactured by clamping or otherwise attaching separately manufactured laminas together and attaching a separately manufactured rotor retaining ring to a laminated or other annular ferromagnetic rotor. Furthermore, if laminas of a rotor that is positioned circumferentially outside a stator slip or move as a result of centrifugal or other forces or as a result of assembly of individual parts to form the rotor stack, the outer surface is no longer perfectly smooth. If a ring or carbon-fiber sleeve around such a rotor is required for protection thereof (such as from environmental or mechanical disruptions or damage), the protective ring or sleeve would experience local stresses due to lamination displacement and/or irregular surface achieved due to rotor laminations being stacked. Manufacturing laminations and support regions and structure of a rotor as a single piece by an additive manufacturing process in accordance with the present invention would ameliorate these shortcomings, such as by allowing for support portions to be machined to effect a smoother outer surface and avoid slippage of laminas to dispense with the additional local stresses that may be caused by lamina slippage in rotors manufactured by conventional methods. Cooling chambers for thermal regulation may also be incorporated in such parts by an additive manufacturing process in accordance with the present invention.

It should be appreciated by those with experience in this field that there are topologies of radial flux, axial flux, and transverse flux electromagnetic machines that may be manufactured in accordance with the present invention other than those specifically illustrated herein. Any of the examples discussed herein, or others, could be modified to incorporate cooling channels, notches, slots, holes, indentations, or other structural features to accommodate windings, attachment of individual parts to each other, or binding compressed parts, could also be implemented by additive manufacturing in accordance with the present invention.

What is claimed is:

1. A method of making a component of an electrical machine comprising:
    using an additive manufacturing process to manufacture a part wherein said additive manufacturing process comprises applying a beam or beams of energy to a successive plurality of ferromagnetic material particles and fusing together the successive plurality of ferromagnetic material particles to form the part; wherein
    the part comprises a ring having an axis or a segment of said ring, said part having a solid portion continuous with a plurality of laminas wherein the plurality of laminas extends from the solid portion in a radial direction of the part.

2. The method of claim 1 wherein the ferromagnetic material particles comprise a metal, a metal alloy, a silicon-metal alloy, a carbon-metal alloy, or any combination of the foregoing.

3. The method of claim 2 wherein the ferromagnetic material particles comprise nickel-iron, silicon-iron, iron, iron-cobalt, ferritic steel, or a combination of one or more of the foregoing.

4. The method of claim 1 further comprising coating the plurality of laminas and a segment of the solid portion of the part with an insulating material, wherein the segment of the solid portion adjoins the plurality of laminas.

5. The method of claim 4 wherein the coating comprises spraying an insulating material on said plurality of laminas and the segment of the solid portion of the part, submerging said plurality of laminas and the segment of the solid portion of the part in the insulating material, or vacuum impregnating the plurality of laminas and the segment of the solid portion of the part with the insulating material.

6. The method of claim 5 wherein the part comprises a plurality of spaces between each of the plurality of laminas and the coating the plurality of laminas comprises filling substantially all of the plurality of spaces between the plurality of laminas with the insulating material.

7. The method of claim 1 wherein the additive manufacturing process comprises selective laser melting, selective laser sintering, direct metal laser sintering, or electron beam melting.

8. The method of claim 1 wherein the part comprises a plurality of slots and a plurality of teeth aligned in an axial direction of the part.

9. The method of claim 1 wherein the part comprises the segment of the ring having the axis, further comprising manufacturing a plurality parts and connecting the plurality of parts together to form the ring.

10. The method of claim 1 wherein the part comprises a cooling chamber or chambers.

11. A method of making a component of an electrical machine comprising:
    using an additive manufacturing process to manufacture a part wherein said additive manufacturing process comprises applying a beam or beams of energy to a successive plurality of ferromagnetic material particles and fusing together the successive plurality of ferromagnetic material particles to form the part; wherein
    the part comprises a ring having an axis or a segment of said ring, said part having a solid portion continuous with a plurality of laminas wherein the plurality of laminas extends from the solid portion in an axial direction of the part.

12. The method of claim 11 wherein the ferromagnetic material particles comprise a metal, a metal alloy, a silicon-metal alloy, a carbon-metal alloy, or any combination of the foregoing.

13. The method of claim 12 wherein the ferromagnetic material particles comprise nickel-iron, silicon-iron, iron, iron-cobalt, ferritic steel, or a combination of one or more of the foregoing.

14. The method of claim 11 further comprising coating the plurality of laminas and a segment of the solid portion of the part with an insulating material, wherein the segment of the solid portion adjoins the plurality of laminas.

15. The method of claim 14 wherein the coating comprises spraying an insulating material on said plurality of laminas and the segment of the solid portion of the part, submerging said plurality of laminas and the segment of the solid portion of the part in the insulating material, or vacuum impregnating the plurality of laminas and the segment of the solid portion of the part with the insulating material.

16. The method of claim 15 wherein the part comprises a plurality of spaces between each of the plurality of laminas and the coating the plurality of laminas comprises filling substantially all of the plurality of spaces between the plurality of laminas with the insulating material.

17. The method of claim 11 wherein the additive manufacturing process comprises selective laser melting, selective laser sintering, direct metal laser sintering, or electron beam melting.

18. The method of claim 11 wherein the part comprises a plurality of slots and a plurality of teeth aligned in a radial direction of the part.

19. The method of claim 11 wherein the part comprises the segment of the ring having the axis, further comprising manufacturing a plurality parts and connecting the plurality of parts together to form the ring.

20. The method of claim 11 wherein the part comprises a cooling chamber or chambers.

* * * * *